July 19, 1966  W. R. WILKINSON  3,261,660

SYRINGE HOLDER FOR STERILIZING

Filed July 24, 1964

INVENTOR.
WALTER R. WILKINSON.
BY
ATTORNEY

United States Patent Office 3,261,660
Patented July 19, 1966

3,261,660
SYRINGE HOLDER FOR STERILIZING
Walter R. Wilkinson, 1613 Euclid Ave., Syracuse, N.Y.
Filed July 24, 1964, Ser. No. 384,990
1 Claim. (Cl. 21—105)

This invention relates to a holder for the parts of a hypodermic syringe, particularly during the sterilization thereof.

Hypodermic syringes, as used from day to day by an individual, as in the treatment of diabetes and the like require sterilization prior to each use. It has been the common practice to disassemble the plunger from the barrel and attached needle and cannulus, and place the same in a sieve and thereafter submerge the parts in a pan of water that is thereafter brought to a boil for sterilization. After subjection to boiling water for five minutes, the sieve is removed from the water, and the syringe parts lifted from the sieve, assembled and put to use. There is nothing in such procedure to prevent one from lifting the parts from the sieve by finger grip in areas that require sterilization. Further, there is nothing about such procedure which tends to encourage removal of the parts from the sieve in such manner as to permit ready assembly of the sterile parts. Such procedure is wasteful in that a much larger quantity of water is brought to a boil than is necessary for effective sterilization.

The present invention is directed to a holder for the disassembled parts of a hypodermic syringe, which will readily secure the same in position during sterilization in a minimum amount of water, or other sterilizing agent, and which renders it substantially impossible after sterilizing for one to mistakenly lift or handle the sterilized parts, except in areas thereof that are unimportant insofar as sterilization is concerned. The invention is further directed to a holder which may be nested in a small box for protecting the parts between use.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings wherein like reference characters indicate like parts:

Figure 2:
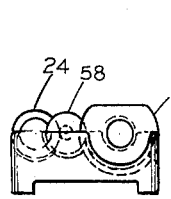
FIGURE 2 is a left hand end elevation of FIGURE 1.

Referring to the drawings there is shown the holder 20, having a semi-circular sectioned groove 22 for the reception of a syringe plunger 24, a semi-circular groove 26 for the reception of a syringe barrel 28, and an intermediate groove 30 in which to nest the rod 32 of the handle member 34. The groove 22 terminates as at 36 at one end, and opens up into a relief area 38 at the other end, of sufficient width to allow one to grasp the plunger 24 by its end flange 40, and the relief portion is provided with a transverse arcuate recess or slot 42 to receive the end flange of the plunger 40, to normally restrict the plunger from endwise movement, while lying in its groove.

The groove 26 terminates at one end in a shallower semi-circular cross section groove 43, large enough to accommodate the needle or cannulus 44 of the syringe barrel 28, and the cross section of the groove 43 is of lesser width than the diameter of the needle sleeve 46 which has a sliding friction fit over the barrel outlet end 48. The other end of the groove 26 is provided with a transverse semi-circular groove or slot 50 of greater radius than the groove 26, to receive the end flange 52 on the open end of the syringe barrel 28, to restrict endwise movement of the barrel when resting in the groove 26.

The intermediate groove 30 terminates at one end as at 54, and opens up at its other end into a deeper groove 56 of greater arcuate cross section, to receive the handle knob 58 of the handle member rod 32. The deeper groove 56 merges laterally into the groove 26, and the latter is relieved at 60, so that when the handle member 34 is removed from the groove, the upper end of the syringe barrel may be readily grasped between fingers, by reason of the relief at 60, and the relief resulting from the groove 56, made large enough to receive the knob, as well as to permit a finger grip upon the syringe barrel resting in the groove 26.

At a center point of the holder, there is provided a vertical threaded aperture 64 to receive the threaded end 66 of the rod 32. The block may have corner feet as at 68.

Figure 1:
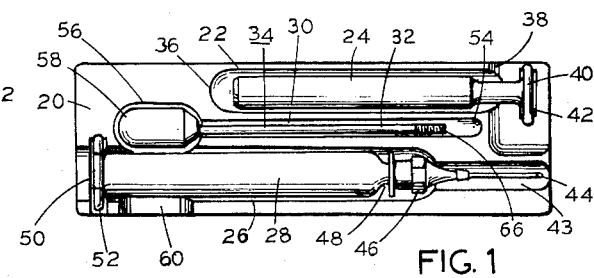
FIGURE 1 is a plan view of a syringe holder, with a syringe barrel and plunger parts in place.
Figure 3:
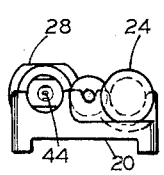
FIGURE 3 is a right hand end elevation of FIGURE 1.
Figure 5:
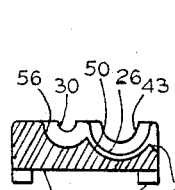
FIGURE 5 is a sectional view taken on the line 5—5 of FIGURE 4.
Figure 4:
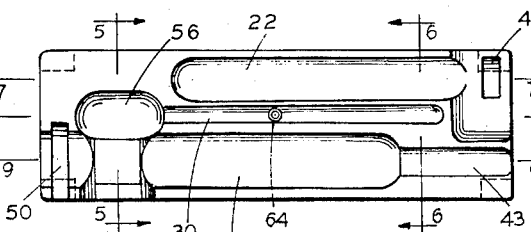
FIGURE 4 is a plan view of the holder with syringe parts removed.
Figure 6:
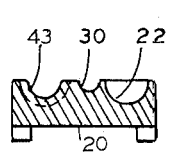
FIGURE 6 is a sectional view taken on the line 6—6 of FIGURE 4.
Figure 10:
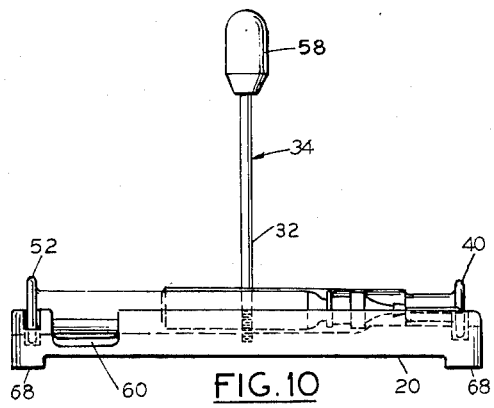
FIGURE 10 is a side elevational view of the holder with a syringe barrel and plunger in place, and the handle in position.
Figure 7:
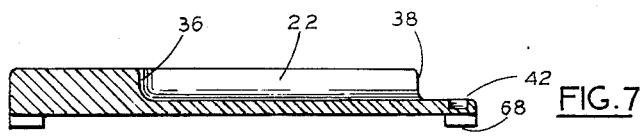
FIGURE 7 is a longitudinal sectional view taken on the line 7—7 of FIGURE 4.
Figure 8:
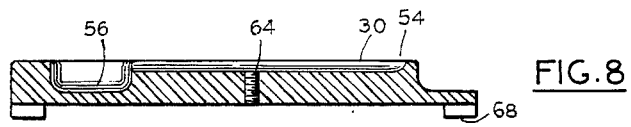
FIGURE 8 is a longitudinal sectional view taken on the line 8—8 of FIGURE 4.
Figure 9:
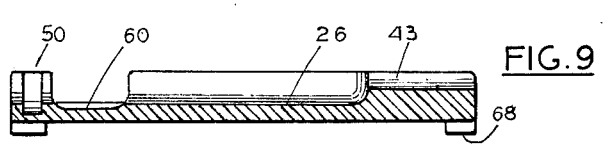
FIGURE 9 is a longitudinal sectional view taken on the line 9—9 of FIGURE 4.

In practice, the holder, with the syringe parts disposed as shown in FIGURE 1 and with its handle 34 threadedly inserted into the holder as shown in FIGURE 10, is ready for immersion in water confined by a small pan, or vessel, the water thereafter being brought to a boil for sterilization of the syringe parts. The groove 26 and groove 22, with their respective slots or recesses 50 and 42 to receive the end flanges of the barrel and plunger respectively, prevent dislocation of the parts during any turbulence present due to the boiling water, and the needle is prevented from dislodgement from the holder, even should it become detached from the barrel, by reason of the shape of the groove 43 in which it lies. None of the parts can get away from the holder.

In practice the holder may be made of any suitable material such as brass, stainless steel, aluminum alloy, or other metal plated so as to resist corrosion, and promote cleanliness, and provide a device readily capable of being kept sanitary. The handle may have a rod of similar material, and the knob may be of nylon to provide heat insulation, so that the holder with its syringe parts can be readily lifted from a hot sterilizing bath. Since the handle nests within its groove when unscrewed from its threaded aperture, the entire holder with syringe parts, may be packed in a small rectangular box for travel or safekeeping when not in use.

It will be seen that after the holder and the syringe parts resting therein have been sterilized in a bath of boiling water, alcohol or other chemical solution acting as a sterilizing agent, the holder is lifted from the bath, following which the barrel is readily removed from its groove, by finger grip of one hand, the plunger removed from its groove by finger grip of the other hand, and thereafter the parts are assembled ready for use. The reliefs provided, tend to prevent one from lifting the parts from the holder when grasped by the fingers at points remote from the portions of the syringe parts, where sterilization is essential.

While the handle 34 is shown as a separate element, it will of course be appreciated that it may be hinged in its groove for lifting to an upright position, or return to a nested position in its groove. The holder can be used in conjunction with a small pan, or a small electric water heater, of a size merely sufficient to receive the holder. In such case a minimum amount of water is required, so that heating the water to the boiling point is quickly effected. At the same time if other sterilizing agents are employed the quantity of such agents required may be minimized by providing a vessel only large enough to nicely receive the holder.

With the holder resting on a table, either of the syringe parts may be laid on an incline cross-wise of the holder in the groove or relief 60, to prevent the part from rolling and to keep one end of the part from contact with a contaminating or unsterile surface.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A holder for sterilizing the parts of a hypodermic syringe comprised of a plunger having a closed end and an end flange opposite the closed end, and a barrel having an open end with surrounding flange at one end and a needle at the opposite end, said holder comprising an elongated block having sides and top and bottom surfaces, handle means comprising a handle having a knob with an attached rod removably screw threaded into said top surface and projecting upwardly from a central portion thereof for lifting said block into and out of sterilizing liquid, three spaced, parallel, longitudinal, semi-circular-sectioned grooves in said top surface consisting of a first groove for accommodating said plunger, a second groove for accommodating said barrel and needle, and an intermediate groove disposed between said first and second grooves for accommodating said removable handle when detached from said block, said first groove having a first predetermined transverse cross-section and depth terminating at one end and opening at its opposite end into a first relieved area of greater transverse cross-section and depth than said first predetermined transverse cross-section and depth, said first relieved area having a transverse arcuate recess to receive the end flange of said plunger, and being disposed adjacent to and opening out through one of said sides, said second groove having a first longitudinal portion of a second predetermined transverse cross-section and depth terminating at one end in the direction of said one of said sides into a second longitudinal portion of lesser transverse cross-section and depth than said second predetermined transverse cross-section and depth to receive said needle, and opening at the end opposite said one end into a second relieved area of greater transverse cross-section and depth than said second predetermined transverse cross-section and depth, said second relieved area being adjacent to and opening in a transverse direction out through another of said sides, said second groove having a third longitudinal portion of the same transverse cross-section and depth as said second predetermined transverse cross-section and depth terminating at one end in the direction of said one of said sides into said second relieved area and opening at the end opposite said last-named end out through a side opposite said one of said sides, each said portion of said second groove being axially aligned, said intermediate groove having a third predetermined cross-section and depth to receive said rod terminating at one end and opening into an enlarged area of greater cross-section and depth than said third predetermined cross-section and depth and of lesser depth than said second predetermined depth of said second groove to receive said knob, said enlarged area opening laterally into and forming an extension of one of said relieved areas, and said relieved areas defining finger reliefs to allow a person to grasp said parts of a hypodermic syringe in their respective grooves.

References Cited by the Examiner

UNITED STATES PATENTS

| | | | |
|---|---|---|---|
| 1,538,571 | 5/1925 | Meinecke et al. | 21—105 |
| 1,980,141 | 11/1934 | MacGregor | 206—43 |
| 2,077,240 | 4/1937 | Jeffords. | |
| 2,084,540 | 6/1937 | Smith. | |
| 2,755,920 | 7/1956 | Weckman | 206—43 |

MORRIS O. WOLK, *Primary Examiner.*

JOSEPH SCOVRONEK, *Examiner.*

J. T. ZATARGA, *Assistant Examiner.*